United States Patent [19]
Peterson

[11] Patent Number: 5,837,188
[45] Date of Patent: Nov. 17, 1998

[54] SILVER RECOVERY SYSTEM

[76] Inventor: David Peterson, 402 Fintona Way, Houston, Tex. 77015

[21] Appl. No.: 813,177

[22] Filed: Mar. 7, 1997

[51] Int. Cl.$^6$ .................................................... C22B 3/00
[52] U.S. Cl. ........................................... 266/101; 266/170
[58] Field of Search .................................... 266/170, 101

[56] References Cited

U.S. PATENT DOCUMENTS

| | | | |
|---|---|---|---|
| 4,441,697 | 4/1984 | Peterson et al. | 266/170 |
| 5,026,029 | 6/1991 | Peterson | 266/170 |
| 5,112,390 | 5/1992 | MacKay | 266/170 |
| 5,603,890 | 2/1997 | Fuller | 266/101 |

*Primary Examiner*—Scott Kastler
*Attorney, Agent, or Firm*—Harrison & Egbert

[57] ABSTRACT

A silver recovery system including a container having an inlet and an outlet, a core member positioned within the container, a filler material adjacent to the core member and being of a metal above silver in the electromotive force series, and a non-metallic mesh material positioned within $3/32$ of an inch from an exterior surface of the filler material. The mesh material has a mesh size suitable for allowing water to pass therethrough. A securing member extends around the exterior surface of the mesh material so as to maintain the mesh material in surface-to-surface contact with the filler material. The mesh material generally surrounds the exterior surface of the filler material. The core member has a central tubular member with a plurality of openings formed radially through a wall thereof. A non-reactive material is affixed within the central tubular member so as to allow silver to plate thereon.

18 Claims, 4 Drawing Sheets

SILVER RECOVERY SYSTEM

TECHNICAL FIELD

The present invention relates to apparatus for silver recovery. More specifically, the present invention relates to a gravity-flow apparatus for use in the recovery of silver from spent photographic fixer solutions.

TECHNICAL FIELD

A number of devices employing containers for recovering silver from spent fixing solutions in photographic paper and film processes are known in the industry. These devices generally entail passing the solution containing silver salts through a metal which is above silver in the electromotive force series. The resultant chemical replacement action causes silver to be deposited within the container as the metal is dissolved. When the metal is exhausted, the contents of the container are processed at a refinery to recover the silver therefrom.

It is important to be able to control the release of silver-containing solutions into the environment. In order to safeguard the environment, it is important to remove the silver salts from solutions prior to disposing of the remaining solution. Attempts have been made, in the prior art, to fashion silver recovery systems that remove a large quantity of the silver from the solution prior to the disposal of the solution. Unfortunately, however, there remains a relatively large silver component in the solution after the solution passes through the silver recovery systems.

U.S. Pat. No. 3,369,801 issued to Harlan G. Hartman on Feb. 20, 1968, discloses a vessel in which the solution flows downward through a core tube to the bottom of the vessel and upward through steel wool to an outlet in the top of the vessel. The chemical reaction referred to above results in the deposition of silver within the vessel as the steel wool dissolves.

Metal screen is used as the filler material in U.S. Pat. No. 3,630,505, issued to Byron R. MacKay on Dec. 28, 1971. The screen wire is therein said to be an improvement because steel wool fibers are quite small in diameter and are easily dissolved. As a consequence, large openings providing less resistive paths are created, permitting the solution to bypass the filler material and exit the vessel with the silver remaining in solution. In this patent the solution fluid is directed through a flow path from the inside surface of the container, through the screen, and upward from the bottom of the core tubing.

U.S. Pat. No. 3,655.175, issued to Victor Zeleny et al. on Apr. 11, 1972 discloses canister in which the solution flows from the bottom of the core tube upward through metal shavings and a bed of neutralizing material of alkaline earth metal carbonate. This patent also discloses horizontal spacers or baffles separating the layers of shavings to prevent short circuitry of the solution as it flows upward through the filler material.

U.S. Pat. No. 3,840,217, issued to Michael T. MacKay on Oct. 8, 1974, discloses a plastic container with influent and effluent liquid passages in the form of T-connectors in its lid. The lower end of the influent tube is a T-shaped baffle for dispersing the influent solution A U-shaped tube is connected between the influent and effluent connectors to accommodate solution overflow. Furthermore, the U-shaped tube is removable from the effluent connector to permit testing of the effluent solution to determine whether silver is being efficiently removed from the solution.

U.S. Pat. No. 4,441,697, issued to Donny L. Peterson et al., on Apr. 10, 1984, discloses a plastic container with influent and effluent liquid passages. The lid has a hole for viewing the inside of the container. This device includes An elongated core with an aperture in its side extending its full length for receiving fluid which is passed through the filler material. It also has a system of longitudinal baffles designed to increase the length of flow of the fluid through the filter. The baffles have an access common to that of the core and extend the length thereof.

U.S. Pat. No. 5,026,029, issued on Jun. 25, 1991, to the present inventor, describes a silver controller system which includes a container, a core member fitted within the container, a filler material extending around the core member, and a fluid deflector extending around the filler material. The fluid deflector is connected to the flange and extends downwardly therefrom so as to be below the aperture in the core member. A plating shield is placed exterior of the fluid deflector. The plating shield is connected to the flange member at one end and generally abuts the bottom of the container at the other end. The plating shield is of a perforated metal suitable for allowing the passage of fluids therethrough.

U.S. Pat. No. 5,112,390 teaches a silver recovery system which, in particular, includes a mesh bag which is press-fitted around the rim of the container. The core member and associated filler material are positioned interior of the mesh bag. The mesh bag is designed, in particular, so as to contain the silver and iron material when the core is removed from the interior of the bag. As such, the particulate matter which falls from the core during the reactive process can be captured and easily disposed of or reprocessed. The mesh bag is not designed so as to provide a surface for the silver to plate on. Furthermore, the mesh bag is arranged so as to be rather distant from the filler material. The mesh bag is, in no way, designed so as to affect the flow of the effluent through the system.

These prior art patents suffer from two similar problems. First, the corrosive nature of the silver-containing solution will quickly create a passageway through the filler material to the outlet. The solution will always flow in the path of least resistance. As more and more of the filler material corrodes, the flow path will follow a hole extending through the filler material which offers little resistance nor receives much of the silver deposit.

Secondly, if the silver-containing solution reaches the filler material before the silver is plated out, the silver will plate to the highly corrosive filler material. As the filler material is depleted, the silver and the filler material will fall to the bottom of the container. As such, it becomes almost impossible for the user to determine the amount of silver that has been recovered.

Thirdly, if the filler material of these prior art systems is depleted, then the silver-containing effluent will pass directly to the tubular interior of the core member. As such, it will flow outwardly of the system without reacting with the filler material.

It is an object of the present invention to provide a silver recovery system which provides a plating surface for the silver so that the silver will not break lose and fall to the bottom of the container.

It is another object of the present invention to provide a silver recovery system which allows silver to plate so that the actual silver will serve as a filtering element and a silver recovery component of the system.

It is a further object of the present invention to provide a silver recovery system so as to provide a system which allows the inner wire filler material core to be separated from the silver prior to passing to a refinery.

It is another object of the present invention to provide a silver recovery system that enhances the purity of the silver which is recovered from the system.

It is another object of the present invention to provide a silver recovery system that enhances the life of the filler material.

It is still another object of the present invention to provide a silver recovery system which is relatively inexpensive, easy to use, and easy to manufacture.

These and other objects and advantages of the present invention will become apparent from a reading of the attached specification and appended claims.

SUMMARY OF THE INVENTION

A silver recovery system that comprises a container having an inlet and an outlet, a filler material within the container of a metal above silver in the electromotive force series, and a non-metallic mesh material positioned within 3/32 of an inch from an exterior surface of the filler material. This mesh material has a mesh size suitable for allowing water to pass therethrough. The mesh material generally surrounds the exterior surface of the filler material. A securing member extends around the exterior surface of the mesh material so as to maintain the mesh material in generally surface-to-surface contact with the filler material. In the preferred embodiment of the present invention, the securing member is an elastic netting material extending circumferentially around the mesh material and the filler material. The mesh material has a dimension of a single mesh opening of between 75 microns and 1/8 of an inch.

The filler material is adjacent to a core member. The core member has a central tubular member. The central tubular member has a plurality of openings formed radially through a wall thereof. These plurality of openings form a generally spiral pattern around the central tubular mender. This spiral pattern extends along a lower half of the central tubular member.

The central tubular member contains a non-reactive material affixed within the central tubular member. This non-reactive material is suitable for allowing silver to plate thereon.

In the preferred embodiment of the present invention, this non-reactive material is of a material similar to the mesh material which surrounds the filler material.

DETAILED DESCRIPTION OF THE INVENTION

Figure 1:
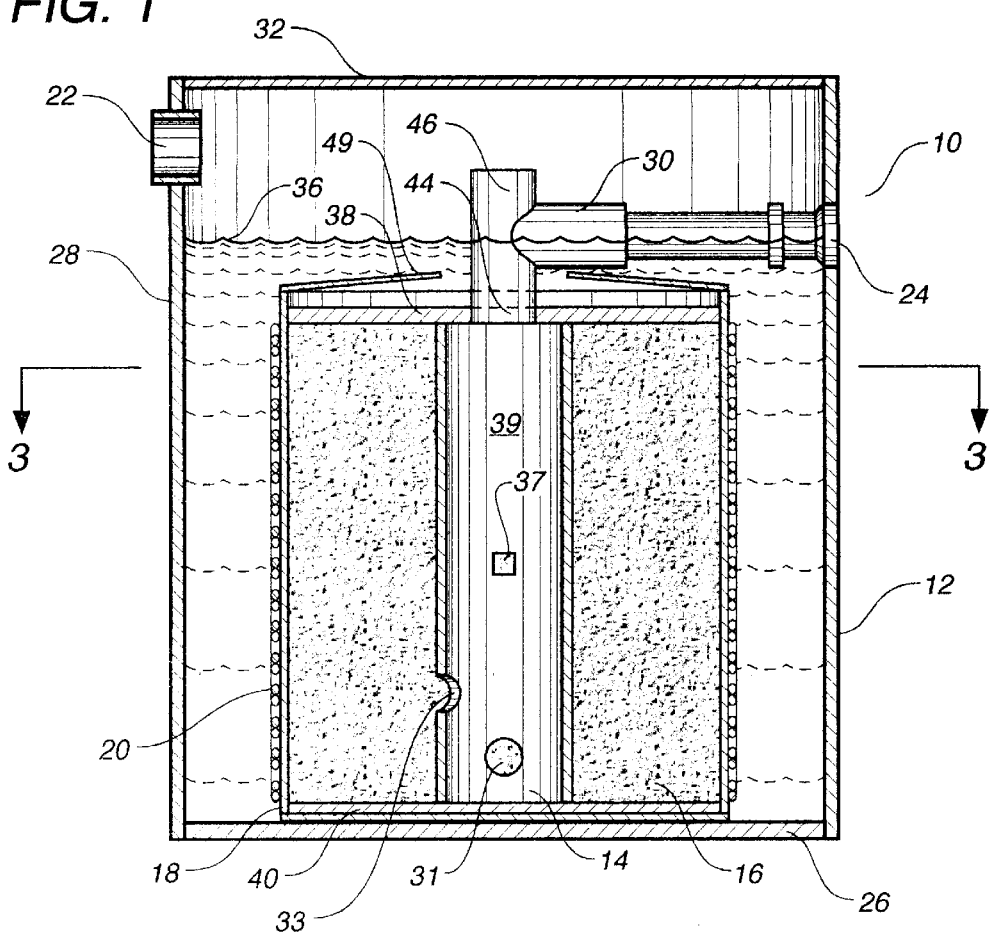
FIG. 1 is a cross-sectional view of the silver recovery system in accordance with the present invention.

Referring to FIG. 1, there is shown at 10 the silver recovery system in accordance with the teachings of the present invention. The silver recovery system 10 comprises a container 12, a core member 14, a filler material 16, a non-metallic mesh material 18, and a securing member 20.

The container 12 has an inlet 22 and an outlet 24. Container 12 also includes a base 26 located at the bottom of the container 12. Specifically, the container 12 is a bucket that has inlet 22 extending through a wall 28 of the container 12. The outlet 24 is connected by an apparatus 30 to the core member 14. As can be seen in FIG. 1, the inlet 22 is located at a higher level within the container 12 than the outlet 24. As such, the present invention may operate as a gravity flow apparatus. The container 12 may be of any standard design and should be made of a non-reactive, non-corrosive material. Container 12 may have a sealed lid 32 having a suitable opening for pouring off excess liquid while preparing for shipment to a processor. Alternatively, the lid 32 may be sealed to the wall 28 of the container 12. It is also possible for the container 12 to incorporate a drainhole for the removal of excess fluid. The container design of the present invention is of a type that is common and known in the art. Specifically, the container design, as shown in U.S. Pat. No. 4,441,698, issued on Apr. 10, 1984, to Peterson et al., would be suitable for use in conjunction with the silver recovery system 10 of the present invention.

The core member 14 is positioned within the interior of the container 12. Core member 14 includes openings 31, 33, 35 and 37 so as to allow the fluid 36 to pass from the container 12 through outlet 24. In particular, the openings 31, 33, 35 and 37 extend in a spiral pattern along the lower half of the central tubular member 39 of the core member 14. As the fluid passes through the filler material 16, it will enter these openings 31, 33, 35 and 37 so as to pass to the interior of the central tubular member 39 and outwardly through the apparatus 30 to the outlet 24. This configuration of the spiral-patterned openings 31, 33, 35 and 37 allows for more even distribution of the effluent flow through the filler material 16. As such, the corrosion of the filler material 16, because of the reaction with the filler material 16, is distributed more evenly. The arrangement of the holes 31, 33, 35 and 37 has been found to extend the life of the silver recovery system 10 significantly.

The core member 14 has a flange member 38 extending outwardly therefrom. Flange member 38 is located above the openings 31, 33, 35 and 37 within the container 12. The central tubular member 39 of the core member 14 is a tubular member which is made of a non-reactive, non-corrosive material. As can be seen in FIG. 1, the core member 14 is generally in abutment with the base 26 of container 12. Core member 14 also includes a bottom flange 40 that extends outwardly from the central tubular member 39. The central tubular member 39 is sealed to both the top flange 38 and the bottom flange 40. The bottom flange 40 will generally rest on the mesh material 18 at the bottom of the container 12.

It can be seen in FIG. 1 that the core member 14 resembles a standard plastic utility wire spool. It is possible to use a spool as the core member 14. When such a standard spool is utilized, there will be a hole in the top and the bottom of the core member 14. The bottom hole can be fitted with a suitable plug. The top hole 44 is prepared to receive a T-fitting 46. Importantly, however, the design of the core member 14 is not intended to be restricted to the use of a standard wire spool. The T-fitting 46 engages the opening 44 of core member 14. T-fitting 46 is in fluid communication with the interior of the core member 14 so that the solution may pass from the core member 14 outwardly through the outlet 24. T-fitting 46 is a standard polyvinyl chloride (PVC)

fitting that is modified to press or screw onto the top of the core member 14. This T-fitting 46 transforms the flow of fluid from its upwardly vertical path in the interior of the central tubular member 39 to a substantially horizontal path outward through outlet 24.

Filler material 16 is arranged adjacent to core member 14 and contained within the area between the top flange 38 and the bottom flange 40 of core member 14. Filler material 16 is a metal above silver in the electromotive force series. Ideally, with the preferred embodiment of the present invention, the filler material is wound around core member 14. Specifically, the filler material 16 is wound steel wire. The wire may be wound in the fashion of a spool about the core member 14 so as to provide the filler material 16 with the desired capacity.

When such a filler is used, the wire should not be wrapped so tightly so as to prevent the filler material 16 from being transversely permeable. The diameter of the filler material 16 may be varied, within limits imposed by the size of the particular container utilized, so as to provide recovery units of varying capacity. Importantly, the present invention should not be limited to just wound wire. It may be possible to utilize substances such as steel shot or other loose material that may be held in place. If a loose metal filler material 16 were utilized, then some apparatus must be utilized so as to maintain the material in position relative to core member 14.

Importantly, in the present invention, the non-metallic mesh material 18 is positioned adjacent to the exterior surface of the filler material 16. This mesh material 18 has a mesh size that is suitable for allowing water to pass therethrough. The size of the mesh which is used with the mesh material allows the effluent to easily pass the liquid therethrough but is restrictive to flow so as to more evenly displace and distribute the liquid flow over the entire exterior surface of the filler material 16. As can be seen in FIG. 1, the mesh material 18 extends around the bottom surface of the bottom flange 40 of the core member 14 and upwardly along the exterior sides of the filler material 16. The top opening 49 opens adjacent to the T-fitting 46. The top opening 49 of the mesh material 18 will reside over the top surface of the top flange 38. In general, the mesh material must be placed within 3/32 of an inch from the exterior surface of the filler material 16. This mesh material 18 should generally surround the exterior surface of the filler material. The mesh material should have a great number of mesh openings formed therein. Each of these mesh openings should have a dimension of between 75 microns and 1/8 of an inch. In particular, in the preferred embodiment of the present invention, the mesh material 18 is a nylon mesh bag. The core member 14 and the filler material 16 are positioned on the interior of the mesh bag.

A securing member 20 extends around the exterior surface of the mesh material 18 opposite the filler material 16. This securing member 20 serves to maintain the mesh material 18 in surface-to-surface contact with the exterior surface of the filler material 16. In the preferred embodiment of the present invention, the securing member 20 is an elastic netting material which extends circumferentially around the mesh material 18 and the filler material 16.

Experiments with the present invention have shown that the arrangement of the mesh material 18 and the securing member 20 serves to effectively remove the silver from the effluent passes into the interior of the container 12. In particular, as the effluent flows through the mesh material 18 into the filler material 16, the silver from the effluent 36 will plate onto the surface of the mesh material 18. Experiments with the present invention have shown that the silver tends to plate on the roughened surface of the mesh material 18. Since the silver is plating on this mesh material 18, it does not break loose and fall to the bottom of the container 12. The silver has a tendency to plate onto the filler material 16 of the core 14. However, since the mesh material 18 is placed on the exterior surface of the filler material 16, the silver will plate directly onto the mesh material. As silver actually plates onto the mesh material 18, the silver will have a tendency to plate onto itself. As such, an accumulation of silver will be found on the surface of the mesh material 18. As the silver continues to plate onto and to "coat" the exterior surface of the mesh material 18, the silver itself will act as a filter so as to prevent silver from passing into the interior of the central tubular member 39 through the openings 31, 33, 35 and 37. The mesh material 18 provides a surface onto which the silver can attach and grow. In prior art systems, the silver would attach to the metal of the filler material 16 and then break away and fall as a mixture to the bottom of the container 12.

Importantly, the silver recovery system of the present invention, by employing the mesh material 18, improves the profitability of the silver recovery system. After a desired period of time, it is easy to separate the wire core 16 from the silver. The securing member 20 can be removed and the mesh material 18 can simply be pulled off of the exterior surface of the filler material 16. As a result, the plates silver will remain on the exterior surface of the mesh material 18. It has been found that the plated silver material on the mesh material 18 will be grade A silver. This silver can be refined as "flake silver" at a better price to the supplier. This is much more profitable than the reprocessing of the silver and the metal mixed together.

In the present invention, it is important to note that the preferred embodiment of the present invention utilizes a nylon-mesh bag as the mesh material. However, it is believed that the present invention would function properly with various other types of mesh material. For example, a cloth sheet could, in theory, be wrapped around the exterior of the filler material 16 so as to accomplish the same purposes as the present invention. Additionally, it is possible to use the elastic netting material of the securing member 20 directly onto the exterior surface of the filler material 16. The mesh material 18 could be placed directly onto the exterior surface of the elastic netting. Another securing member would have to be placed on the exterior surface of the mesh material 18 so as to assure that the mesh material 18 was positioned within 3/32 of an inch from the exterior surface of the filler material 16.

Figure 2:
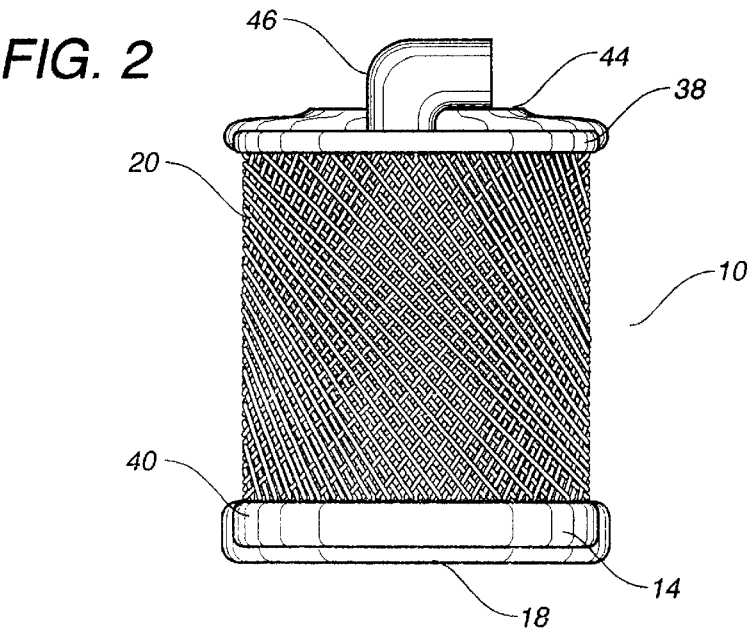
FIG. 2 is a side elevational view of the silver recovery system of the present invention.

FIG. 2 is a general view showing the appearance of the silver recovery system 10 of the present invention. As can be seen, the mesh material 18 extends around the bottom of the core member 14. The elastic netting material of the securing member 20 extends around the exterior surface of the mesh material 18 so as to place the mesh material 18 into compressive contact with the exterior surface of the filler material (not shown). The top opening 44 of the mesh material 18 allows the fitting 46 to extend upwardly therethrough. In particular, in FIG. 2, it can be seen that the mesh material 18 is in the form of the nylon mesh bag. It is only necessary that the core member 14 and its associated filler material 16 be placed onto the interior of the mesh bag. The elastic netting 20 can then be slidably affixed onto the exterior surface of the mesh bag between the top flange 38 and the bottom flange 40 of the core member 14.

Figure 3:
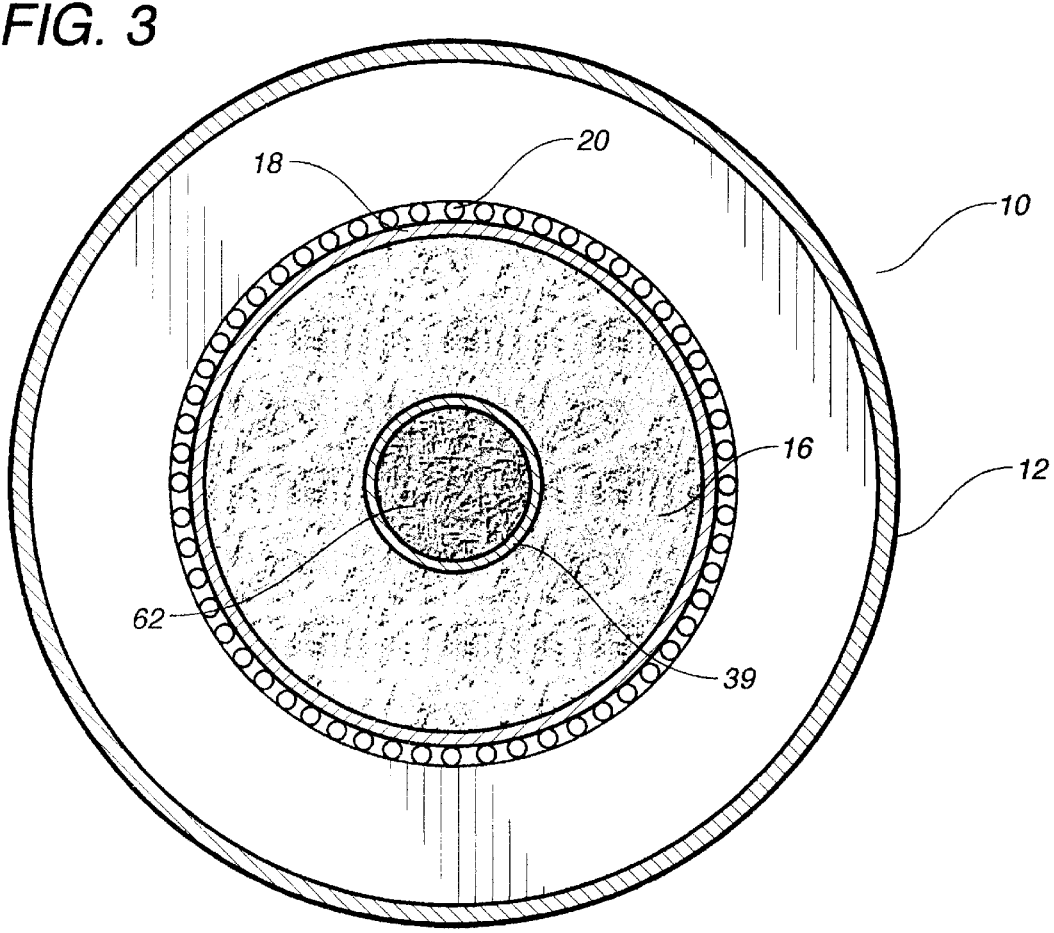
FIG. 3 is a cross-sectional taken across lines 3—3 of FIG. 1.

FIG. 3 illustrates the interior of the silver recovery system 10 of the present invention. It can be seen that the container 12 has a generally cylindrical configuration. The central tubular member 39 is placed generally in the center of the container 12. The filler material 16 extends outwardly from the central tubular member 39. The mesh material 18 and the securing member 20 are positioned such that the mesh material 18 is juxtaposed onto the exterior surface of the filler material 16. As can be seen, the mesh material 18 surrounds the filler material 16 on the interior of the container 12.

Importantly, in the present invention, experiments have shown that enhanced silver recovery is accomplished by placing a non-reactive material 62 on the interior of the central tubular member 39. In particular, this non-reactive material 62 is affixed within the interior surface of the central tubular member 39. As such, as the reacted effluent passes through the filler material 16 and enters the interior of the central tubular member 39, it will contact the non-reactive material 62. The non-reactive material should be of a material suitable for allowing the silver to plate thereon. As such, it should have a somewhat "roughened" surface so as to provide a base for the plating action. In the preferred embodiment of the present invention, this non-reactive material 62 can be a wadded section of the mesh material 18 which is stuffed into the interior of the central tubular member 39. By placing this material on the interior of the central tubular member 39, additional silver recovery will occur for those minute amounts of silver which should happen to pass through the openings in the central tubular member 39.

Figure 4:
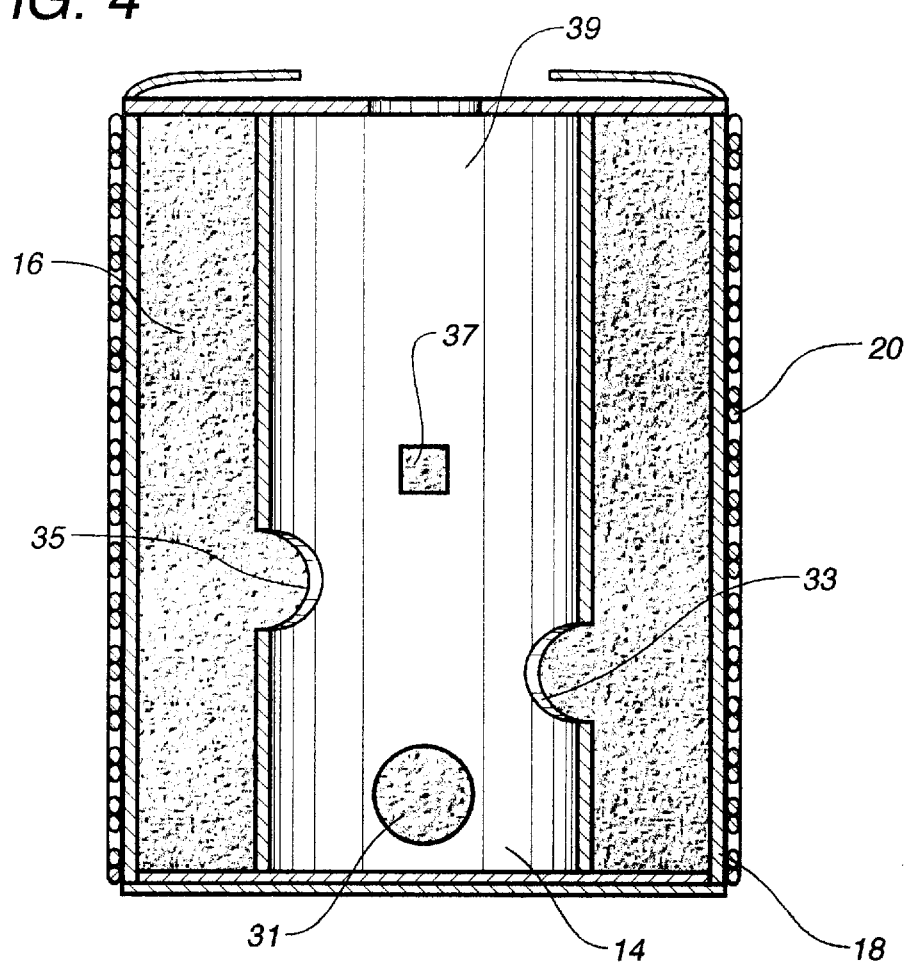
FIG. 4 is an isolated view showing the configuration of the present invention on the interior of the container.

FIG. 4 is another view of the core member 14 showing, in particular, the arrangement of the openings 31, 33, 35 and 37. The openings 31, 33, and 35 are formed by drilling holes radially through the wall of the central tubular member 39 of core member 14. The opening 37 is formed by the manner of connection between two separate sections of the central tubular member 39. The openings 31, 33, 35 and 37 are arranged in a somewhat "spiral" pattern around the circumference of the central tubular member 39. As such, the arrangement of these openings tends to draw the effluent through the filler material from various directions. This maximizes the reactive surface between the filler material 16 and the effluent. The non-reactive material 62 can be placed within the interior of the central tubular member generally in the location of the openings 31, 33, 35 and 37. It can be seen that the openings 31, 33, 35 and 37 are located in the lower half of the central tubular member 39.

FIG. 4 also shows how the mesh material 18 extends around the entire exterior surface of the filler material 16. The securing member 20 serves to force the mesh material 18 into surface-to-surface contact with the exterior surface of the filler material 16.

Figure 5:
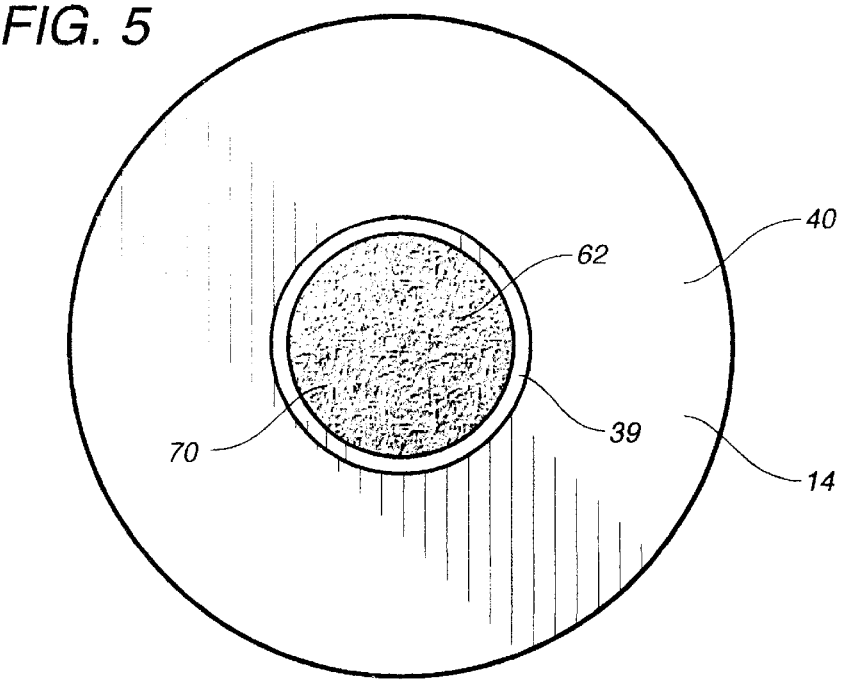
FIG. 5 is an isolated view showing the core member with the non-reactive material on the interior of the central tubular member.

FIG. 5 illustrates how the non-reactive material 62 is located within the interior 70 of the central tubular member 39 of core member 14. As shown in FIG. 5, the bottom flange 40 of the core member 14 is illustrated. The central tubular member 39 is located centrally of the bottom flange 40. The non-reactive material 62 is positioned on the interior of the central tubular member 39.

Figure 6:
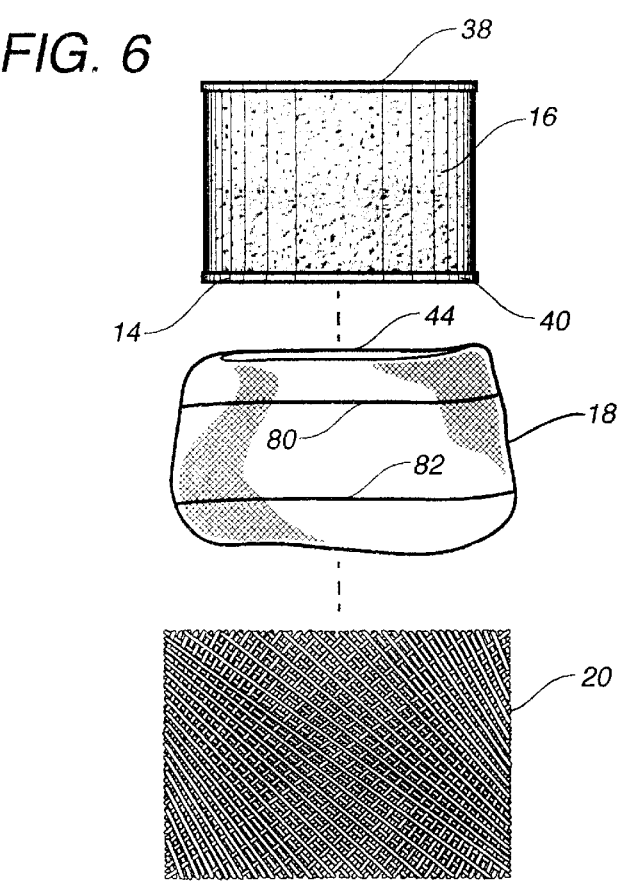
FIG. 6 is an exploded view showing the assembly of the silver recovery system of the present invention.

FIG. 6 shows the arrangement and assembly of the system 10 of the present invention. Initially, it can be seen that the core member 14 has the filler material 16 located between the top flange 38 and the bottom flange 40. This unitary assemblage of the core member 14 and the filler material 16 is then placed into the interior of the mesh material 18. The mesh material 18 is in the form of a nylon mesh bag having an upper opening 44. As such, the core member 14 and the filler material 16 can simply be dropped into the interior of the mesh bag 18. The elastic netting material 20 can then be placed around the exterior of the mesh bag 18 so as to force the mesh surfaces of the mesh bag 18 into surface-to-surface compressive contact with the exterior surface of the filler material 16.

As shown in FIG. 6, it is important to note that a wire 80 and a wire 82 extend around the exterior surface of the mesh bag 18. The wire 80 and the wire 82 should be of a similar material as the filler material 16. It has been found that the positioning of the wires 80 and 82 in interposition between the elastic netting 20 and the exterior surface of the mesh bag 18 will enhance the ability of the silver to begin plating on the exterior surface of the mesh bag 18. It can be seen in FIG. 6 that these wires 80 and 82 extend circumferentially around the exterior surface of the mesh bag 18.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. The present invention is a silver recovery system comprising:
    a container having an inlet and an outlet;
    a filler material positioned within said container, said filler material being a metal above silver in the electromotive force series; and
    a non-metallic mesh material positioned within 3/32 of an inch from an exterior surface of said filler material, said mesh material having a mesh size suitable for allowing water to pass therethrough.

2. The system of claim 1, said mesh material generally surrounding the exterior surface of said filler material.

3. The system of claim 1, further comprising:
    a securing means extending around an exterior surface of said mesh material, said securing means for maintaining said mesh material in surface-to-surface contact with said filler material.

4. The system of claim 3, said securing means being an elastic netting material extending circumferentially around said mesh material and said filler material.

5. The system of claim 3, further comprising:
    a wire of a metal identical to the metal of said filler material, said wire interposed between said mesh material and said securing means.

6. The system of claim 1, said mesh material having a dimension of between 75 microns and 1/8 of an inch for a single mesh opening of said mesh material.

7. The system of claim 1, said mesh material being a nylon mesh bag, said filler material positioned on an interior of said mesh bag.

8. The system of claim 1, further comprising:
    a core member adjacent to said filler material, said core member having a central tubular member, said central tubular member having a plurality of openings formed radially through a wall of said central tubular member.

9. The system of claim 8, said plurality of openings forming a generally spiral pattern around said central tubular member, said spiral pattern extending along a lower half of said central tubular member.

10. The system of claim 1, further comprising:
    a core member adjacent said filler material, said core member having a central tubular member, said central tubular member containing a non-reactive material affixed within an interior of said central tubular member, said non-reactive material suitable for allowing silver to plate on a surface thereof.

11. A silver recovery system comprising:

a container having an inlet and an outlet;

a core member positioned within said container, said core member having a central tubular member formed thereon, said central tubular member having a plurality of openings formed radially through a wall of said central tubular member;

a filler material adjacent said core member, said filler material being of a metal above silver in the electromotive force series; and a non-metallic mesh material positioned within 3/32 of an inch from an exterior surface of said filler material, said mesh material having a mesh size suitable for allowing water to pass therethrough.

12. The system of claim 11, said plurality of openings forming a generally spiral pattern around said central tubular member, said spiral pattern extending along a lower half of said central tubular member.

13. The system of claim 11, said central tubular member containing a non-reactive material affixed within said central tubular member, said non-reactive material suitable for allowing silver to plate thereon.

14. The system of claim 11, further comprising:

a securing means extending around an exterior surface of said mesh material, said securing means for maintaining said mesh material in surface-to-surface contact with said filler material.

15. The system of claim 11, said mesh material generally surrounding said exterior surface of said filler material.

16. A silver recovery system comprising:

a container having an inlet and an outlet;

a core member positioned within said container, said core member having a central tubular member formed therein, said central tubular member containing a non-reactive material affixed within said central tubular member, said non-reactive material suitable for allowing silver to plate thereon;

a filler material adjacent said core member, said filler material being a metal above silver in the electromotive force series; and a non-metallic mesh material positioned within 3/32 of an inch from an exterior surface of said filler material, said mesh material having a mesh size suitable for allowing water to pass therethrough.

17. The system of claim 16, said non-reactive material being of an identical material as said non-metallic mesh material.

18. The system of claim 16, further comprising:

a securing means extending around an exterior surface of said mesh material, said securing means for maintaining said mesh material in surface-to-surface contact with said filler material.

* * * * *